(12) United States Patent
Ungaretti et al.

(10) Patent No.: US 7,595,648 B2
(45) Date of Patent: Sep. 29, 2009

(54) DEVICE AND METHOD FOR READING A CAPACITIVE SENSOR, IN PARTICULAR OF A MICRO-ELECTROMECHANICAL TYPE

(75) Inventors: Tommaso Ungaretti, Pavia (IT); Ernesto Lasalandra, S. Donato Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 300 days.

(21) Appl. No.: 11/565,454

(22) Filed: Nov. 30, 2006

(65) Prior Publication Data

US 2007/0152682 A1    Jul. 5, 2007

(30) Foreign Application Priority Data

Dec. 2, 2005    (EP) .................................. 05425863

(51) Int. Cl.
*G01R 27/26* (2006.01)
*H03F 1/02* (2006.01)

(52) U.S. Cl. .............................. 324/678; 324/676; 330/9
(58) Field of Classification Search ................. 324/678; 330/9
See application file for complete search history.

(56) References Cited

U.S. PATENT DOCUMENTS

| | | | | | |
|---|---|---|---|---|---|
| 3,879,660 | A | * | 4/1975 | Piso | 324/663 |
| 4,208,625 | A | * | 6/1980 | Piso | 324/671 |
| 5,343,156 | A | | 8/1994 | Johnson et al. | 324/672 |
| 5,637,798 | A | | 6/1997 | Schatz | 73/514.32 |
| 5,801,307 | A | * | 9/1998 | Netzer | 73/170.17 |
| 5,808,198 | A | | 9/1998 | Ward et al. | 73/514.32 |
| 6,388,453 | B1 | * | 5/2002 | Greer | 324/667 |
| 6,470,748 | B1 | * | 10/2002 | Geen | 73/504.12 |
| 6,621,334 | B2 | * | 9/2003 | Ausserlechner et al. | 330/9 |
| 6,714,025 | B2 | * | 3/2004 | Mohaupt et al. | 324/681 |
| 6,856,144 | B2 | | 2/2005 | Lasalandra et al. | 324/661 |
| 7,134,336 | B2 | * | 11/2006 | Mase et al. | 73/504.12 |
| 2003/0048036 | A1 | * | 3/2003 | Lemkin | 310/309 |
| 2003/0098699 | A1 | * | 5/2003 | Lemkin et al. | 324/678 |
| 2005/0218911 | A1 | * | 10/2005 | Denison | 324/661 |

FOREIGN PATENT DOCUMENTS

JP     10111207     4/1998
WO     WO 2005068959 A2 *   7/2005

\* cited by examiner

*Primary Examiner*—Timothy J Dole
(74) *Attorney, Agent, or Firm*—Lisa K. Jorgenson; Robert Iannucci; Seed IP Law Group PLLC

(57) ABSTRACT

A read device of a capacitive sensor includes: a signal source supplying an electrical read signal for driving the capacitive sensor; and a discrete-time sense circuit for generating an electrical output signal, correlated to variations of capacitance of the capacitive sensor, in response to variations of the electrical read signal. The device moreover includes: a modulator stage for generating a modulated electrical read signal on the basis of the electrical read signal and supplying the modulated electrical read signal to the capacitive sensor; a demodulator stage, connected to the sense circuit, for demodulating the electrical output signal and generating a demodulated electrical output signal; and a low-pass filtering stage for generating a filtered electrical output signal, on the basis of the modulated electrical output signal.

31 Claims, 10 Drawing Sheets

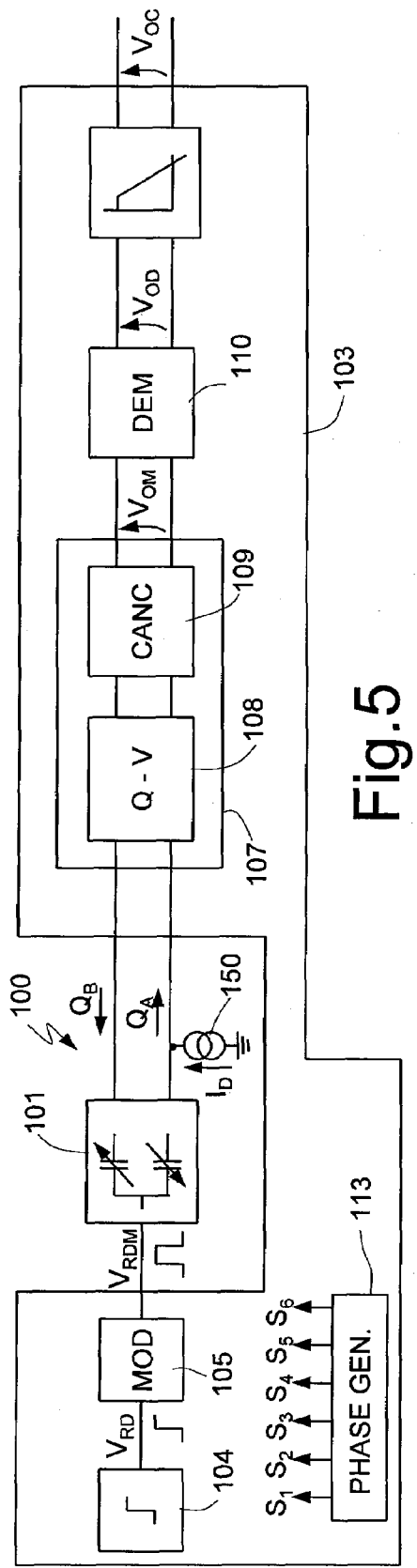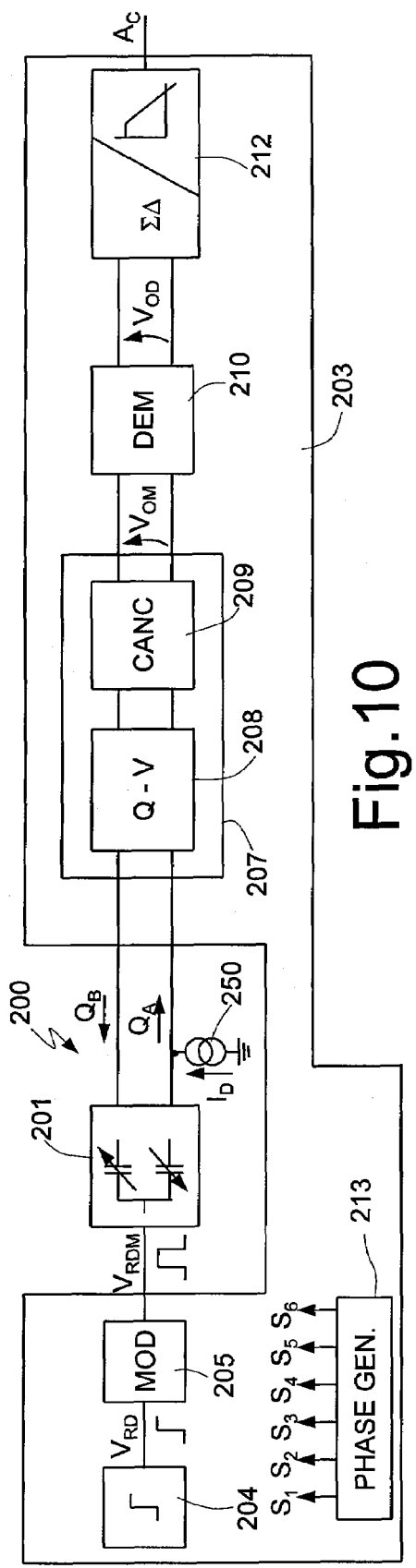
Fig. 5
Fig. 10

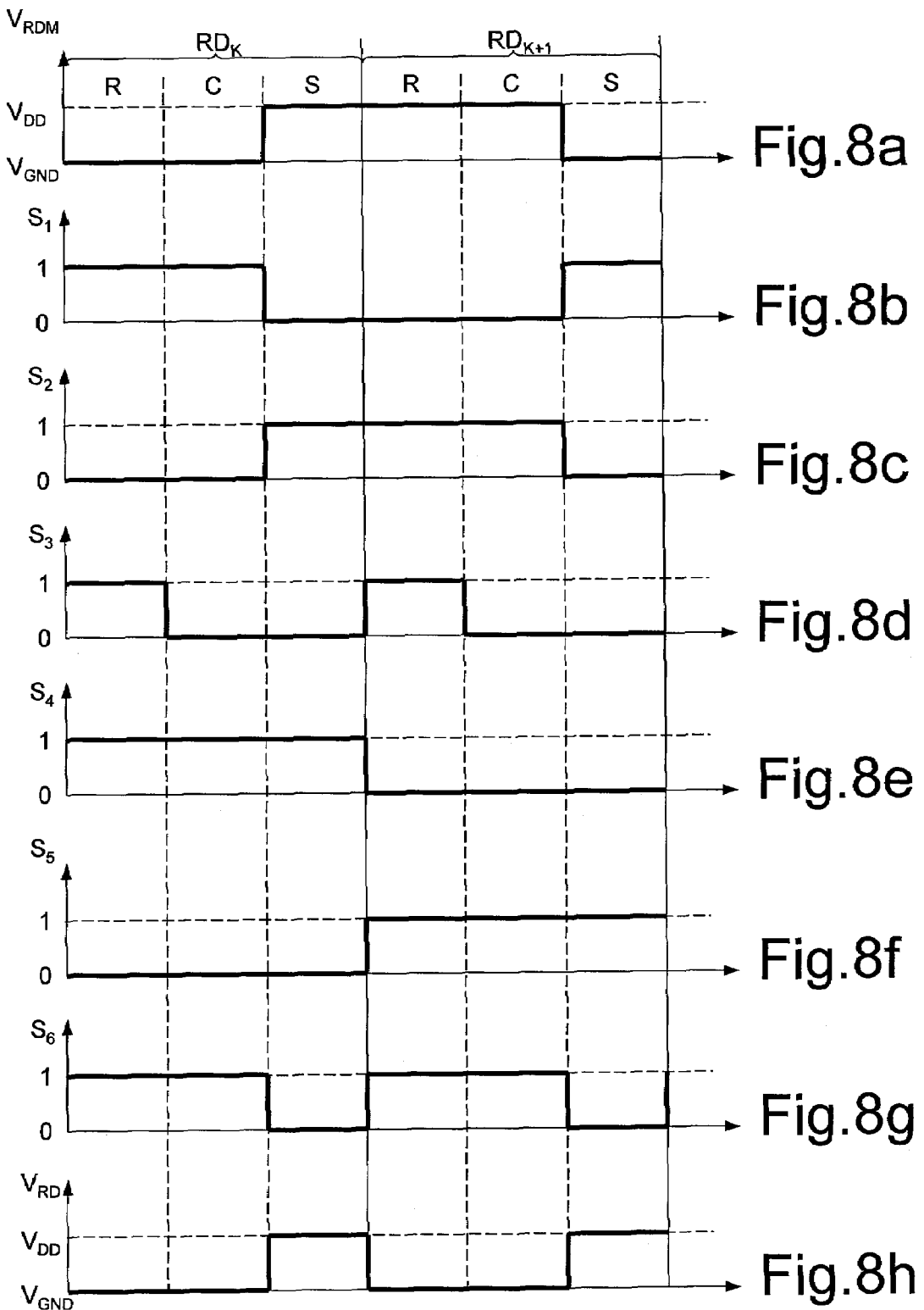

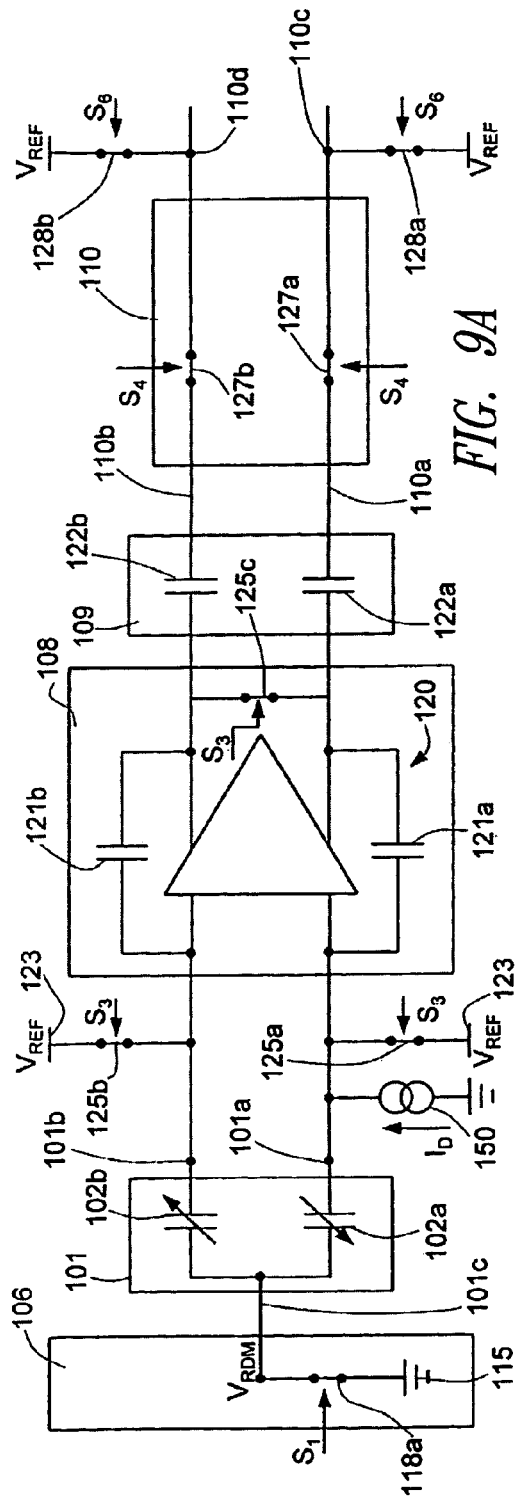
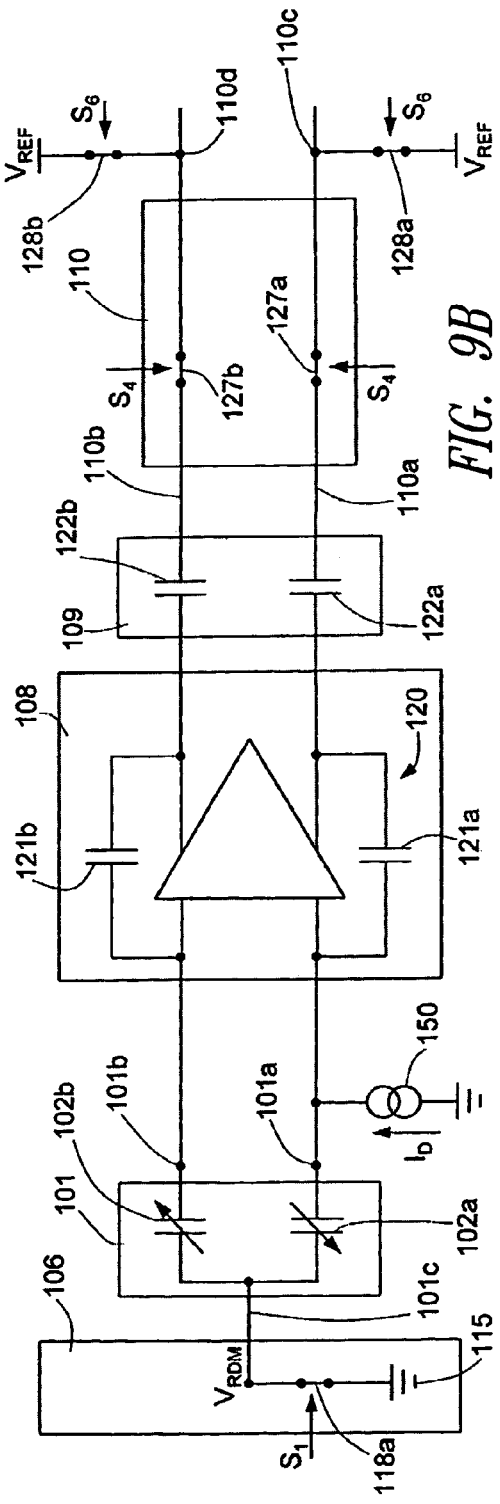
FIG. 9A
FIG. 9B

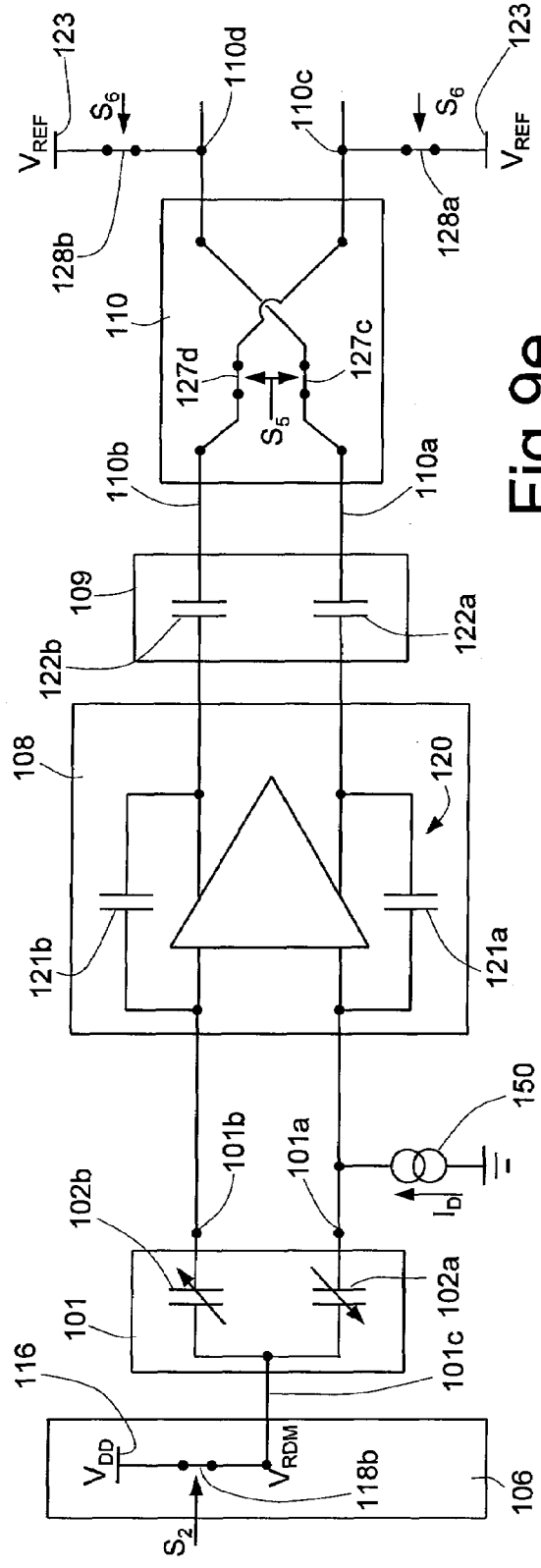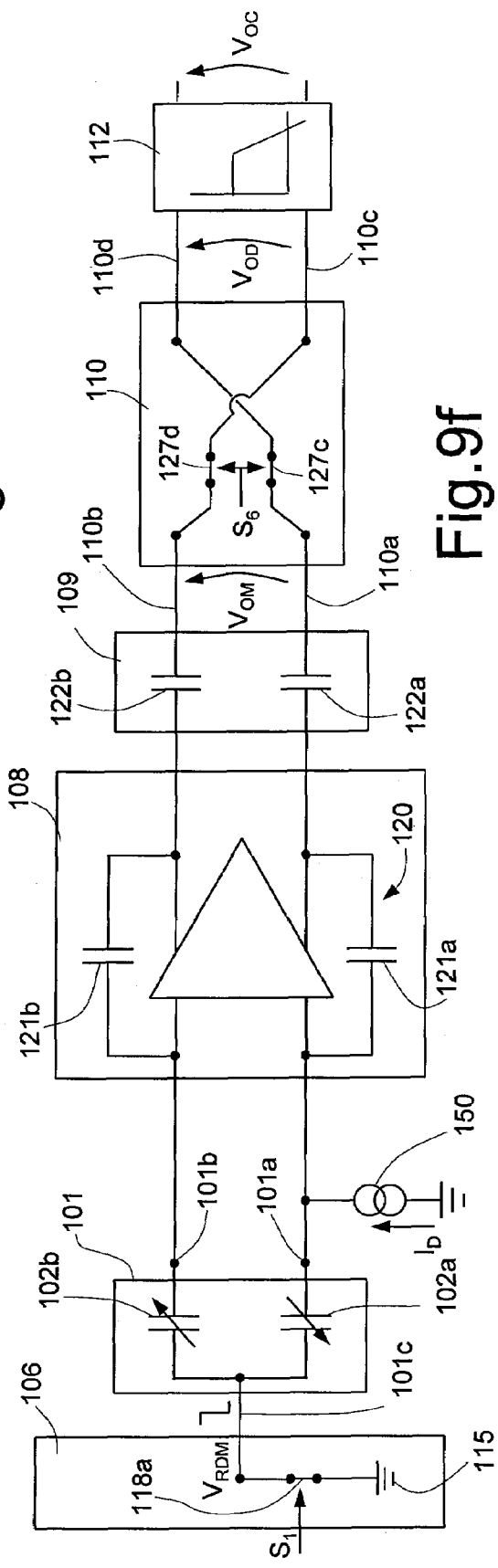
Fig.9e
Fig.9f

DEVICE AND METHOD FOR READING A CAPACITIVE SENSOR, IN PARTICULAR OF A MICRO-ELECTROMECHANICAL TYPE

BACKGROUND OF THE INVENTION

1 Field of the Invention

The present invention relates to a device and to a method for reading a capacitive sensor, in particular of a micro-electromechanical type.

2 Description of the Related Art

As is known, the use of capacitive sensors is continuously spreading to numerous applications, in which the reduction of consumption is a fundamental target. For example, capacitive inertial micro-electromechanical-system (MEMS) sensors of a differential type are increasingly frequently used in a wide range of portable electronic devices, such as cell phones, palm-top computers, digital camcorders and cameras, and the like, which are supplied autonomously by batteries. Clearly, in cases of this sort the reduction of the consumption is indispensable for increasing the autonomy of the device.

In order to minimize the power absorption, very frequently traditional continuous-time read circuits for capacitive sensors have been replaced by switched-capacitor (SC) read circuits, which are much more suitable for operating with low supply voltages and an extremely low current consumption. In a parallel manner, reading techniques have been developed for optimizing the reading precision and sensitivity. For example, the so-called "correlated-double-sampling" (CDS) technique enables effective elimination of the disturbance caused by possible offsets and low-frequency noise (1/f noise, or flicker noise) of the electronics used (typically, a charge-voltage converter including a charge amplifier).

By way of example, FIGS. 1-3 show the different steps for reading a capacitive inertial sensor 1 of a differential MEMS type, using the CDS technique. In particular, in FIGS. 1-3 the inertial sensor 1 is represented by means of an equivalent electrical diagram and comprises a first sense capacitor 2a and a second sense capacitor 2b having a first common terminal, which forms a driving terminal 1c of the inertial sensor 1. Second terminals of the first sense capacitor 2a and of the second sense capacitor 2b form a first sense terminal 1a and, respectively, a second sense terminal 1b of the inertial sensor 1. In practice, the two capacitors 2a, 2b have differentially variable capacitances, i.e., they have the same capacitance at rest $C_S$, when the inertial sensor 1 is not subjected to the quantity to be sensed, and show capacitance variations of equal amplitude and opposite sign when the inertial sensor 1 senses a quantity along a pre-set axis.

A read circuit 3 is associated to the inertial sensor 1 and comprises a signal source 4, a charge-voltage converter 5, and a canceling stage 7.

The signal source 4 is connected to the driving terminal 1c of the inertial sensor 1 and supplies a step read voltage $V_{RD}$.

The charge-voltage converter 5 includes a fully differential switched-capacitor charge amplifier 10, having a first integration capacitor 11a connected between a first input and a first output and a second integration capacitor 11b connected between a second input and a second output. Furthermore, the first input and the second input of the charge amplifier 10 are connected to the first sense terminal 1a and to the second sense terminal 1b of the inertial sensor 1, respectively.

The canceling stage 7 comprises a first hold capacitor 12a and a second hold capacitor 12b, respectively connected in series to the first output and to the second output of the charge amplifier 10. Furthermore, terminals of the first hold capacitor 12a and of the second hold capacitor 12b form a first output 3a and, respectively, a second output 3b of the read circuit 3.

In a first step, or reset step, the signal source 4 (herein illustrated with a dashed line) sends the driving terminal 1c of the inertial sensor 1 to a ground value. The first input and the second input of the charge amplifier 10 are instead brought to a reference line 15, which supplies a constant reference voltage $V_{REF}$, whereas the first output and the second output are short-circuited. For this purpose, first reset switches 16a, 16b, connected between the reference line 15 and a respective input of the charge amplifier 10, and a second reset switch 16c, arranged between the outputs of the charge amplifier 10 itself, go into a closed condition.

In a second step, or offset-canceling step, the first reset switches 16a, 16b and the second reset switch 16c are opened condition, while the driving terminal 1c of the inertial sensor 1 is still kept at the ground voltage. Furthermore, a first canceling switch 18a, connected between the reference line 15 and the first output 3a, and a second canceling switch 18b, connected between the reference line 15 and the second output 3b, are closed. In this way, any possible disturbance, such as 1/f noise, and a possible offset introduced by the charge amplifier 10 cause a canceling voltage $V_C$ between the outputs by the charge amplifier 10 itself. The canceling voltage $V_C$ is in practice stored in the first hold capacitor 12a and in the second hold capacitor 12b.

Finally, a third step or sensing step is executed, in which the first reset switches 16a, 16b, the second reset switch 16c, and the canceling switches 18a, 18b are opened, and the signal source (illustrated with a solid line) supplies the step read voltage $V_{RD}$ to the driving terminal 1c of the inertial sensor 1. Through the first sense capacitor 2a and the second sense capacitor 2b, a first sense charge $Q_A$ and, respectively, a second sense charge $Q_B$, correlated to the capacitive unbalancing of the inertial sensor 1, are supplied to the inputs of the charge amplifier 10 and converted into a rough output voltage $V_{OR}$, which includes the contributions of noise and of offset due to the charge amplifier 10. The canceling stage 7 subtracts the canceling voltage $V_C$, stored by the first hold capacitor 12a and the second hold capacitor 12b. In response to the step of the read voltage $V_{RD}$, then, the read circuit 3 supplies a corrected output voltage $V_{OC}$, which substantially is not affected by the contribution of the low-frequency noise and of the offsets introduced by the electronics.

Albeit effective for eliminating the disturbance described, the CDS technique does not, however, enable suppression of the low-frequency disturbance generated upstream of the charge amplifier 10. Said disturbance can have different origins, but, basically, takes the form of a differential disturbance current $I_D$ supplied in parallel to the currents due to the injection of charge ($Q_A$, $Q_B$) performed by the inertial sensor 1 (the disturbance is represented schematically by a current generator 20 in FIG. 4). In particular, an important source of disturbance is represented by the first reset switches, which, even when opened, have dispersion currents (of an intensity of up to a few nanoamps). The problem, in addition, becomes increasingly more important because the need to reduce also the overall dimensions pushes in the direction of using as switches MOS transistors with very short channel, which suffer more from current leakages. Other causes of disturbance are the inevitable thermal drifts and the ageing of the components, so that spurious resistive paths may be formed within the inertial sensor 1.

BRIEF SUMMARY OF THE INVENTION

One embodiment of the present invention provides a device and a method for reading a capacitive sensor, which will enable the drawbacks described above to be overcome.

BRIEF DESCRIPTION OF THE SEVERAL VIEWS OF THE DRAWINGS

For a better understanding of the invention, there is now described an embodiment thereof, provided purely by way of non-limiting example and with reference to the attached plate of drawings, wherein:

FIG. 5 is a simplified block diagram of a read device of a capacitive sensor in accordance with a first embodiment of the present invention;

FIGS. 8a-8h are graphs that illustrate time plots of respective signals present in the device illustrated in FIG. 5;

FIGS. 9a-9f show the device illustrated in FIG. 5 in respective operative configurations during two consecutive read cycles;

FIG. 10 is a simplified block diagram of a read device of a capacitive sensor in accordance with a second embodiment of the present invention;

DETAILED DESCRIPTION OF THE INVENTION

Illustrated in FIG. 5 and designated by the reference number 100 is an apparatus for detecting accelerations, comprising an inertial sensor 101 of a differential capacitive MEMS type, and a read device 103, associated to the inertial sensor 101. The example that will be described hereinafter must not, however, be considered limiting in so far as the invention can be used for reading capacitive sensors of any type.

Figure 7:
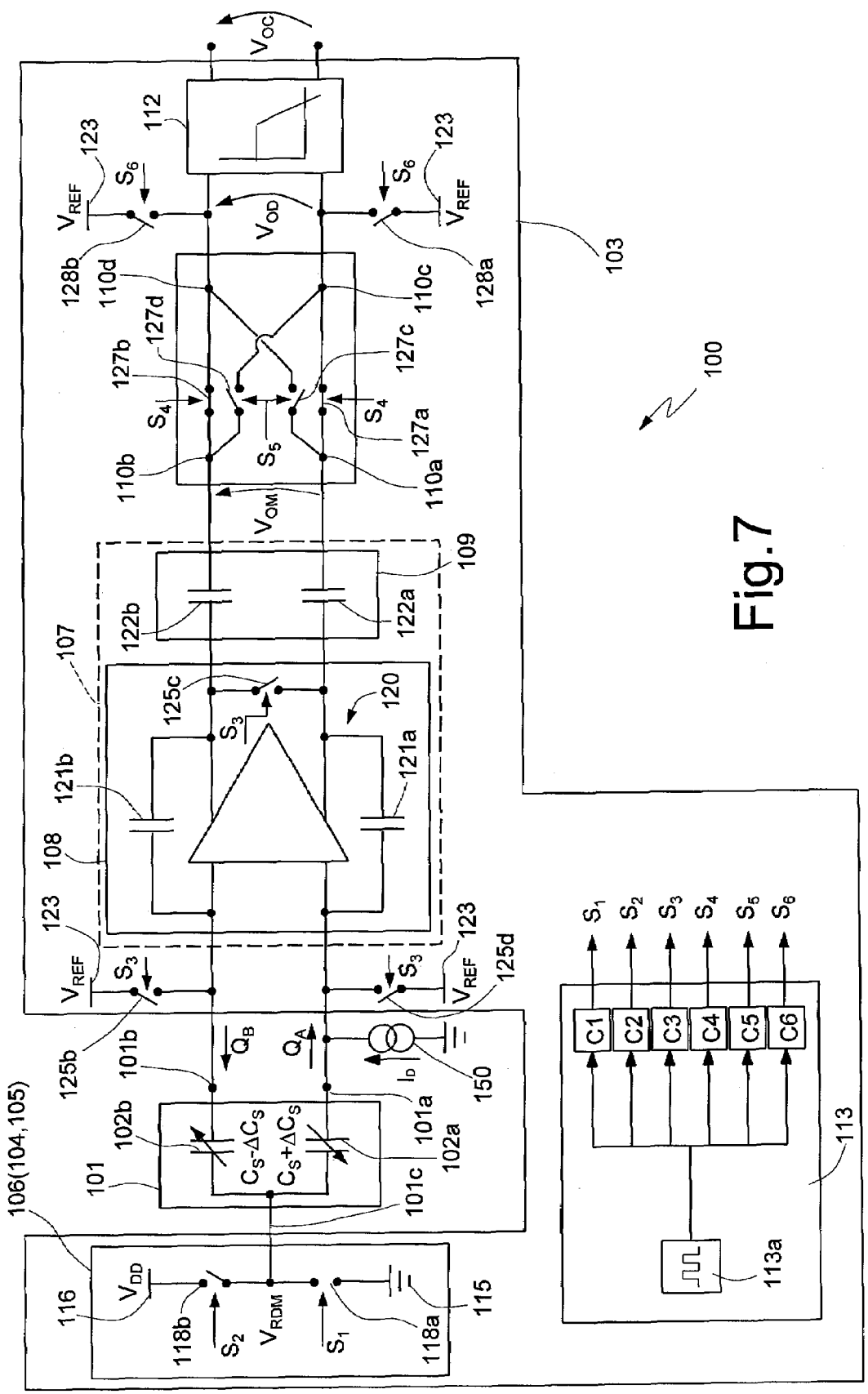
FIG. 7 is a simplified electrical diagram of the device illustrated in FIG. 5.

The inertial sensor 101, in itself known, comprises a movable body (not illustrated), which is movable with respect to a fixed body (which is not illustrated either) and is capacitively coupled thereto so as to form in practice a first sense capacitor 102a, and a second sense capacitor 102b (see for this item FIG. 7). The capacitance of the first sense capacitor 102a and second sense capacitor 102b depend on the relative position of the movable body with respect to the fixed body and vary in a differential way. In practice, the first sense capacitor 102a and the second sense capacitor 102b have the same rest capacitance $C_S$ when the inertial sensor 1 is not subjected to the quantity to be sensed, and show capacitance variations $\Delta C_S$ of equal amplitude and opposite sign when the inertial sensor 1 senses an acceleration along a predetermined axis. In FIG. 5, disturbance caused by the inertial sensor 101 is represented schematically by a current generator 150, which injects a disturbance current $I_D$ into the input of the read device 103.

The read device 103 is of the discrete-time type and comprises a signal source 104, a modulator stage 105, a sense circuit 107, a demodulator stage 110, and a low-pass filter 112. Furthermore, a phase-generator stage 113 generates a plurality of timing signals $S_1$-$S_6$, necessary for coordinating operation of the different components of the read device 103. In greater detail, the phase-generator stage 113 comprises an oscillator 113a and a plurality of timing modules C1-C6, controlled by the oscillator 113a, each of which generates a respective timing signal $S_1$-$S_6$.

The signal source 104 supplies a step read voltage $V_{RD}$, preferably of an amplitude equal to the maximum dynamics available, which, in the embodiment described, is equal to the supply voltage $V_{DD}$ (for example, 3 V).

The modulator stage 105 is arranged between the signal source 104 and the inertial sensor 101 and modulates the read voltage $V_{RD}$, multiplying it at each read cycle alternately by +1 and −1 (for example, the reading frequency is comprised between 10 and 100 kHz). In practice, a square-wave modulated read voltage $V_{RDM}$ is present on the output of the modulator stage 105 and is supplied to the inertial sensor 101. Reading of the inertial sensor 101 is performed on each edge, both the leading edge and the trailing edge, of the modulated read voltage $V_{RDM}$.

The sense circuit 107 comprises a charge-voltage converter 108 and a canceling stage 109.

The charge-voltage converter 108, of the switched-capacitor type, is set downstream of the inertial sensor 101. In particular, the charge-voltage converter 108 receives a first sense charge $Q_A$ and a second sense charge $Q_B$, which are supplied by the inertial sensor 101 in response to the modulated read voltage $V_{RDM}$ and are correlated to the differential variations of capacitance $\Delta C_S$ of the first sense capacitor 102a and of the second sense capacitor 102b.

The canceling stage 109 is connected in series to outputs of the charge-voltage converter 108 and is used for canceling the offset and the low-frequency noise introduced by the charge-voltage converter 108 itself. A modulated output voltage $V_{OM}$ is present between the outputs of the canceling stage 109.

The demodulator 110 is cascaded to the canceling stage 109, for receiving the modulated output voltage $V_{OM}$, which is again multiplied alternately by +1 and −1 at each read cycle and converted into a demodulated output voltage $V_{OD}$.

Finally, the low-pass filter 112 receives the demodulated output voltage $V_{OD}$, eliminates the high-frequency components, and supplies a corrected output voltage $V_{OC}$.

Figure 1:
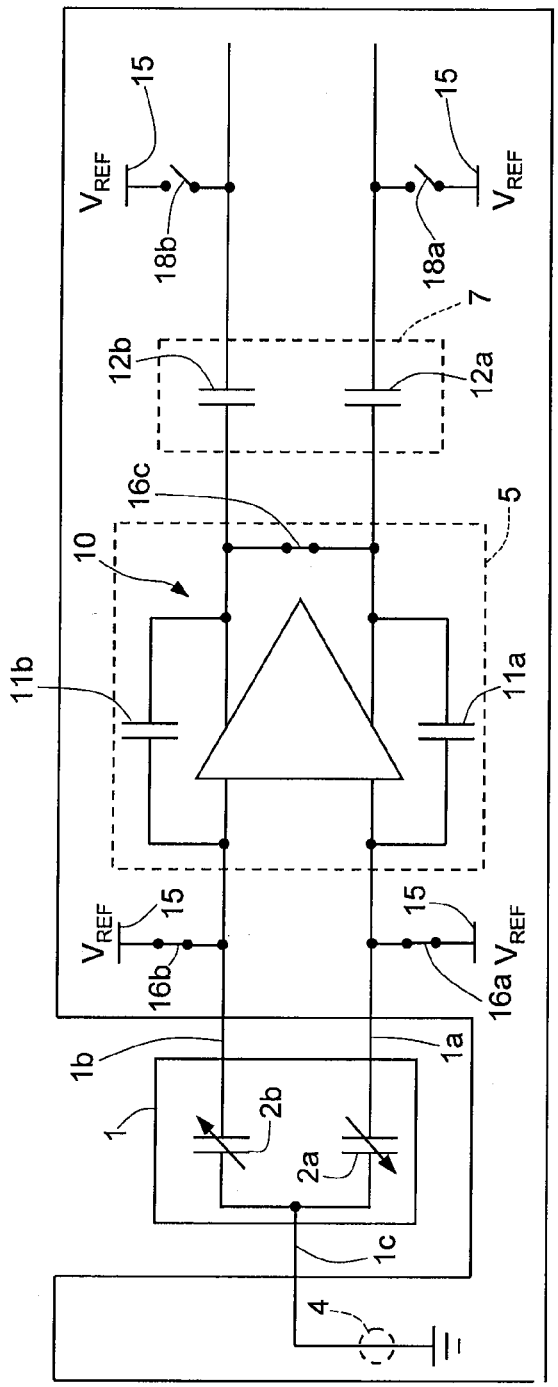
FIGS. 1-3 show a simplified electrical diagram of a known read circuit in three successive steps of a read method, which is also known.
Figure 2:
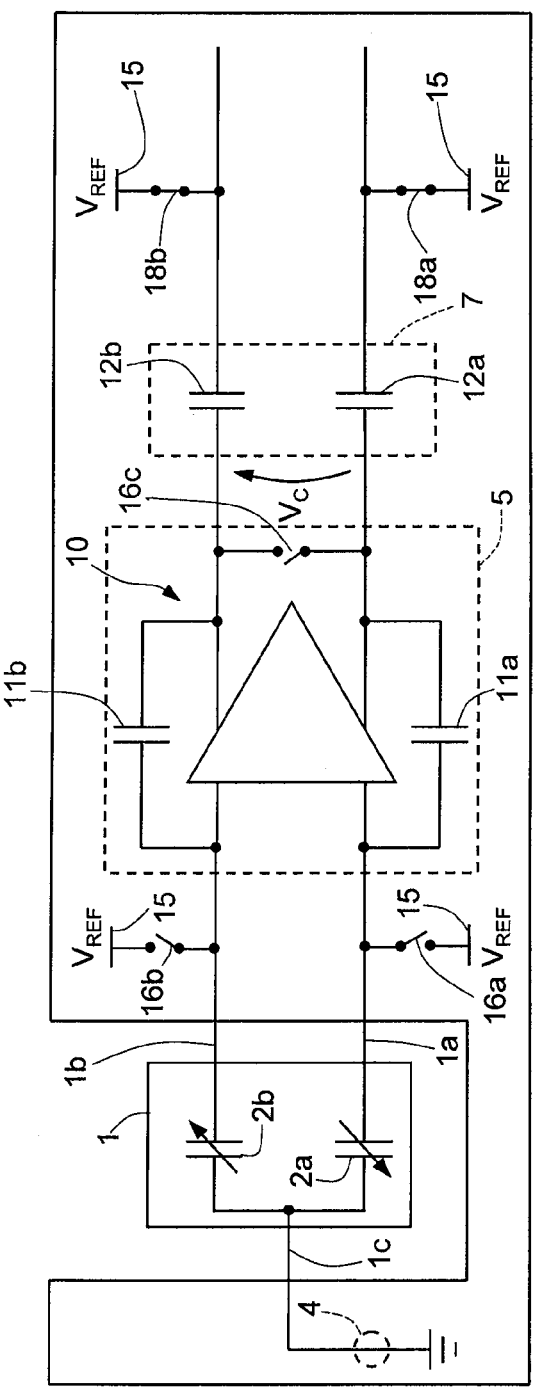
Figure 3:
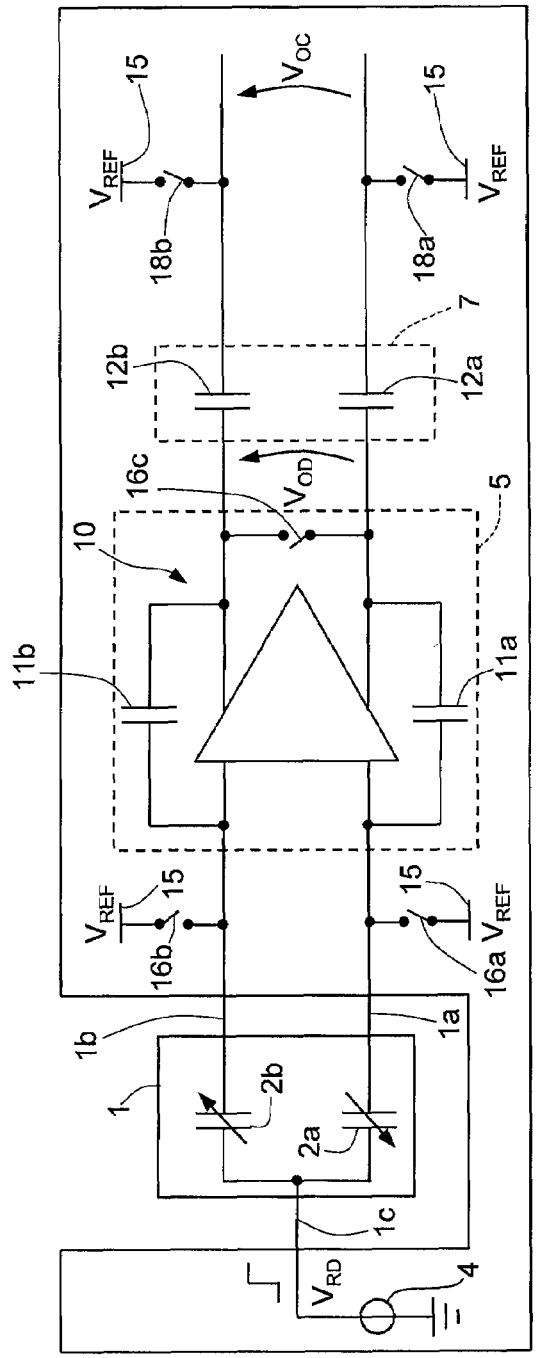
Figure 4:
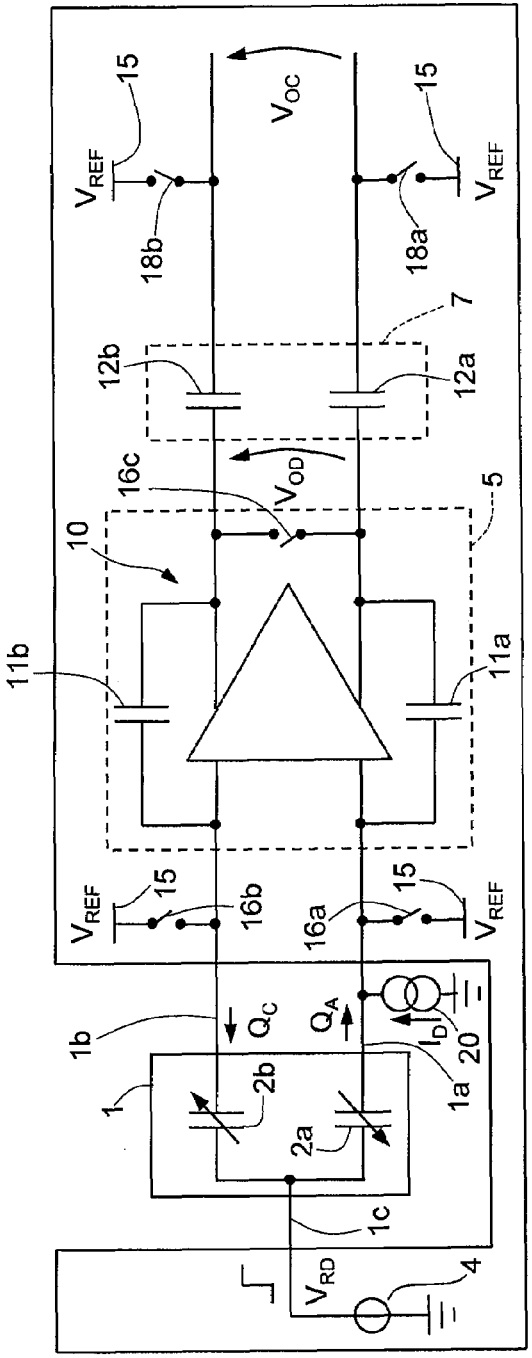
FIG. 4 shows the circuit illustrated in FIGS. 1-3 and, in addition, a schematic representation of sources of disturbance.
Figure 6A:
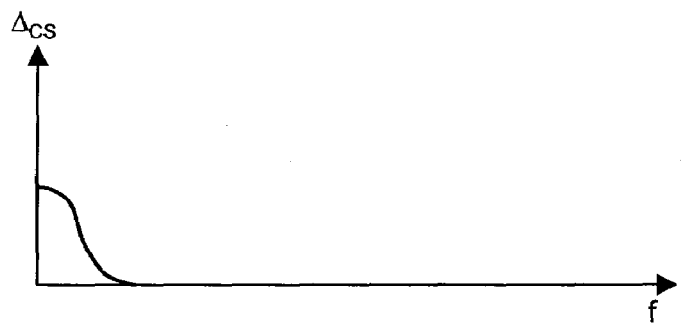
FIGS. 6a-6e are graphs that illustrate frequency spectra of respective signals present in the device illustrated in FIG. 5.
Figure 6B:
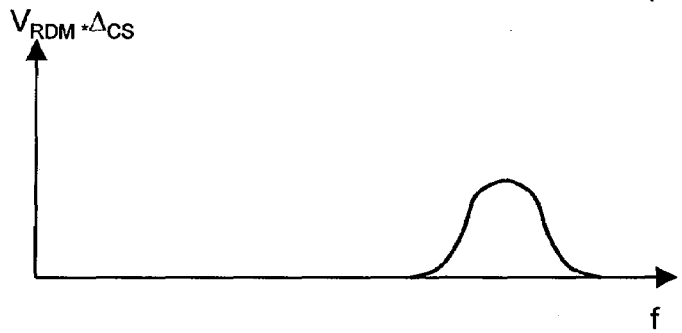
Figure 6C:
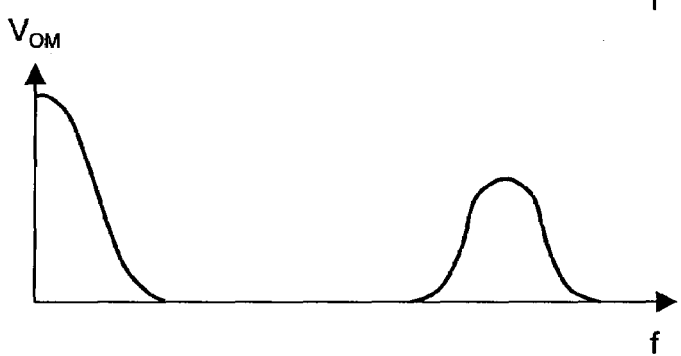
Figure 6D:
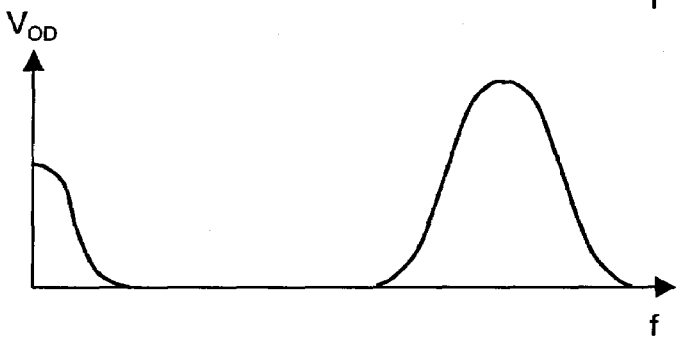
Figure 6E:
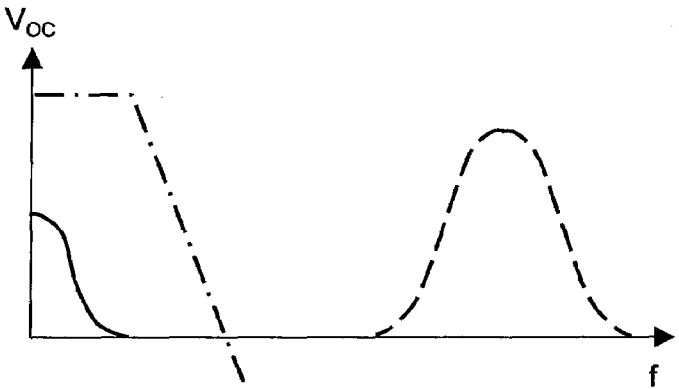

The read device 103 enables suppression also of the disturbance due to the inertial sensor 101, in addition to the low-voltage noise and to the offset introduced by the charge-voltage converter 108. The modulation, in fact, enables separation of the harmonic content of the read voltage $V_{RD}$ and of the variations of capacitance $\Delta C_S$ from that of the disturbance caused by the inertial sensor 101. In particular, the modulation translates at high frequency the spectrum of the variations of capacitance $\Delta C_S$ that are linked to the quantities detected by the inertial sensor 101 (i.e., the useful signal, FIGS. 6a and 6b), whereas the disturbance components, which intervene downstream of the charge-voltage converter 108, remain in base band (FIG. 6c, modulated output voltage $V_{OM}$). The demodulation in practice reverses the content, and hence the useful component, which contains the information on the variations of capacitance $\Delta C_S$ of the inertial sensor 1, is brought back into the base band, whereas the disturbance component is translated at high frequency (FIG. 6d, demodulated output voltage $V_{OD}$). The disturbance can then readily be eliminated by the low-pass filter 112, provided that the reading frequency is sufficiently high (FIG. 6e, corrected output voltage $V_{OC}$; the harmonic components linked to the disturbance that are suppressed and the transfer function of the low-pass filter 112 are respectively represented by a dashed line and dashed and dotted line).

FIG. 7 shows a more detailed circuit implementation of the acceleration-detection apparatus 100.

The inertial sensor 101 is represented schematically by the first sense capacitor 102a and the second sense capacitor 102b, which have a common terminal forming the driving input 101c and respective second terminals forming a first sense terminal 101a and a second sense terminal 101b.

The signal source 104 and the modulator stage 105 are formed by a single circuit, hereinafter referred to as modulated source 106, comprising a ground line 115, set at a ground voltage $V_{GND}$ (0 V), a supply line 116, supplying a supply voltage $V_{DD}$, and a first read switch 118a and a second read switch 118b, respectively controlled by a first timing signal $S_1$ and a second timing signal $S_2$ (the first timing signal $S_1$ and the second timing signal $S_2$ are generated by a first timer module C1 and by a second timer module C2, respectively). More precisely, the first read switch 118a and the second read switch 118b have a terminal in common connected to the driving terminal 101c of the inertial sensor 101; moreover, the first read switch 118a is connected to the ground line 115, whereas the second read switch 118b is connected to the supply line 116.

The charge-voltage converter 108 comprises a fully differential switched-capacitor charge amplifier 120, having a first integration capacitor 121a connected between a first input and a first (non-inverting) output and a second integration capacitor 121b connected between a second input and a second (inverting) output. The first input and the second input of the charge amplifier 120 are connected to the first sense terminal 101a and, respectively, to the second sense terminal 101b of the inertial sensor 101. Furthermore, the first input and the second input of the charge amplifier 120 can be selectively connected to a reference line 123, supplying a constant reference voltage $V_{REF}$ by a first reset switch 125a and, respectively, a second reset switch 125b. A third reset switch is connected between the outputs of the charge amplifier 120. All the reset switches 125a, 125b, 125c are controlled by one and the same third timing signal $S_3$, generated by a third timer module C3 of the phase-generator stage 113.

The canceling stage 109 comprises a first hold capacitor 122a and a second hold capacitor 122b, respectively connected in series to the first output and to the second output of the charge amplifier 109.

The demodulator stage 110 has a first input 110a and a second input 110b and a first output 110c and a second output 110d. A first direct-connection switch 127a and a second direct-connection switch 127b are connected between the first input 110a and the first output 110c and between the second input 110b and the second output 110d, respectively, and are controlled by a same fourth timing signal $S_4$ generated by a fourth timer module C4. A first crossed-connection switch 127c and a second crossed-connection switch 127d are connected between the first input 110a and the second output 110d and between the second input 110b and the first output 110c, respectively, and are controlled by a same fifth timing signal $S_5$ generated by a fifth timer module C5. In particular, the direct-connection switches 127a, 127b and the crossed-connection switches 127c, 127d are controlled so that the connection between the inputs 110a, 110b and the outputs 110c, 110d of the demodulator stage 110 is reversed in consecutive read cycles. In other words, if in a read cycle $RD_K$ the first input 110a is connected to the first output 110c and the second input 110b is connected to the second output 110d, in the immediately ensuing read cycle $RD_{K+1}$ the first input 110a is connected to the second output 110d, and the second input 110b is connected to the first output 110c. In consecutive read cycles $RD_K$, $RD_{K+1}$, then, the sign of the demodulated output voltage $V_{OD}$ is once equal (multiplication by +1) and once opposite (multiplication by −1) to the sign of the modulated output voltage $V_{OM}$.

The first output 110c and the second output 110d of the demodulator stage 110 are moreover selectively connectable to the reference line 123 by a first canceling switch 128a and, respectively, a second canceling switch 128b, which are controlled by a same sixth timing signal $S_6$, generated by a sixth timer module C6 of the phase-generator stage 113.

Finally, in the embodiment described herein, the low-pass filter 112 is of a discrete-time analog type and is substantially configured so as to calculate the arithmetic mean of pairs (or in any case an even number) of successive samples of the demodulated output voltage $V_{OD}$. The corrected output voltage $V_{OC}$ is hence proportional to said arithmetic mean.

Operation of the acceleration-detection apparatus 100 will be explained hereinafter with reference also to FIGS. 8a-8g, which represent time plots corresponding to the modulated read voltage $V_{RDM}$ (FIG. 8a) and to the timing signals $S_1$-$S_6$ (FIGS. 8b-8g) during two consecutive read cycles $RD_K$, $RD_{K+1}$. By way of reference, FIG. 8h illustrates the theoretical evolution of the read voltage $V_{RD}$ which is not visible in the read device 103 illustrated in FIG. 7 because the signal source 104 and the modulator stage are provided in a single circuit. In each of the read cycles $RD_K$, $RD_{K+1}$, the steps of reset, offset canceling, and sensing are designated, respectively, by R, C, and S. Furthermore, it is understood that, when the timing signals $S_1$-$S_6$ assume the logic values "1" and "0", the corresponding switches are in a closing condition and an opening condition, respectively.

FIGS. 9a-9f show in a simplified way the configuration of the acceleration-detection apparatus 100 in the various steps of reset, canceling and sensing of the two read cycles $RD_K$, $RD_{K+1}$. In particular, only the parts each time used are illustrated.

Throughout the read cycle $RD_K$, the direct-connection switches 127a, 127b of the demodulator stage 110 are in closed, and the crossed-connection switches 127c, 127d (not illustrated) are open.

In the reset step of the read cycle $RD_K$, initial levels of d.c. voltage are fixed for the sense circuit 107. In detail, the switched source 106 keeps the driving terminal 101c of the inertial sensor 101 at ground (FIG. 9a, where the first read switch 118a is closed, whilst the second read switch 118b, not illustrated, is open). The reset switches 125a, 125b, 125c are all closed: consequently, the outputs 101a, 101b of the inertial sensor 101 and the inputs of the charge amplifier 120 are connected to the reference line 123, whereas the outputs of the charge amplifier 120 are short-circuited (reset configuration). Also the canceling switches 128a, 128b are closed, thus connecting the outputs 110c, 110d of the demodulator stage 110 and the capacitors 122a, 122b of the canceling stage 109 to the reference line 123.

In the subsequent canceling step (FIG. 9b), the reset switches 125a, 125b, 125c (not illustrated) are opened, together with the canceling switches 128a, 128b. Any possible offsets introduced by the charge amplifier 120 are stored on the capacitors 122a, 122b of the canceling stage 109.

Figure 9C:
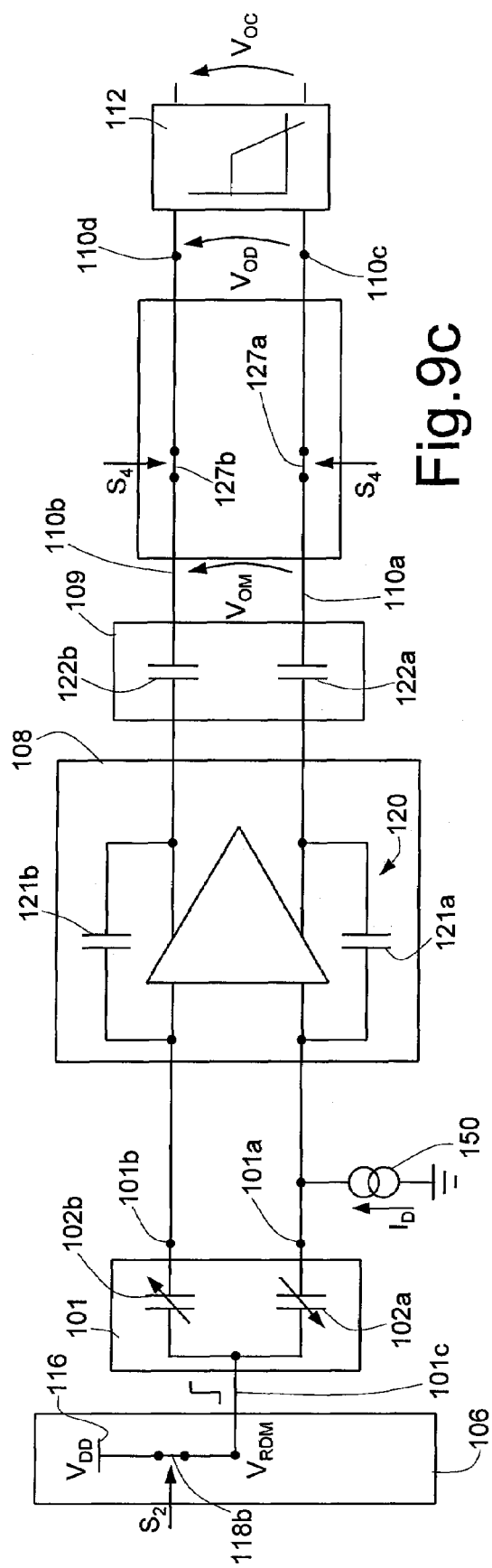
Figure 9D:
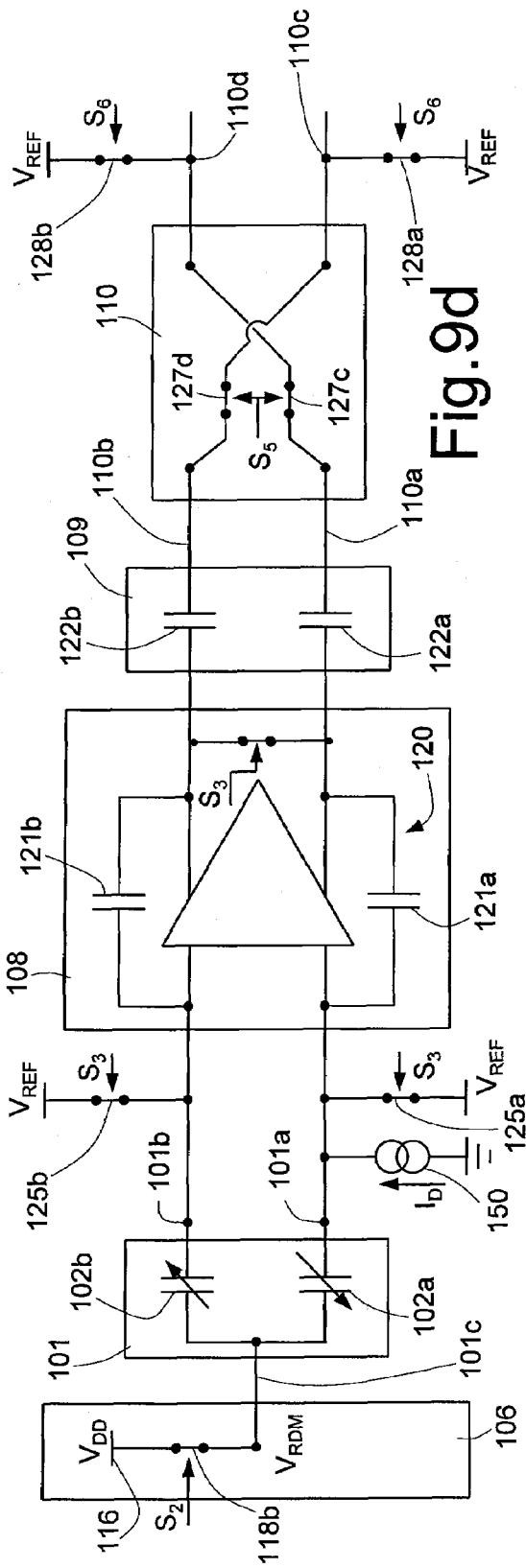

A sensing step is then executed (FIG. 9c). In detail, the first read switch 118a and the canceling switches 128a, 128b (herein no longer illustrated) are opened, whereas the second read switch 118b are closed. In this way, the driving terminal 101c of the inertial sensor 101 is connected to the supply line 116 and thus receives a positive-voltage step having amplitude equal to $V_{DD}$ (indicated schematically in FIG. 9c). In response to the positive-voltage step, the output of the canceling stage 109 supplies a value of the modulated output voltage $V_{OM}$, correlated to the variations of capacitance $\Delta C_S$ of the inertial sensor 101, which, however, does not remain constant. In fact, the disturbance current $I_D$ (substantially constant) is integrated by the charge amplifier 120, and its effect is superimposed on the injection of charge of the inertial sensor 101 and causes a drift of the modulated output voltage $V_{OM}$, with a first sign. Furthermore, the demodulated output voltage $V_{OD}$ is equal both in absolute value and in sign to the modulated output voltage $V_{OM}$.

The read cycle $R_{DK}$ comes to an end, and the next read cycle $RD_{K+1}$ is executed. In this case, the modulated source 106 keeps the driving terminal 101c of the inertial sensor 101 at the supply voltage $V_{DD}$ during the steps of reset and canceling and supplies a negative-voltage step in the sensing step.

More in detail, in the reset step (FIG. 9d) the second read switch 118b, the reset switches 125a, 125b, 125c, and the canceling switches 128a, 128b are closed, whereas the first read switch 118a and (herein not illustrated) are opened. Furthermore, the crossed-connection switches 127c, 127d of the demodulator stage 110 are closed, and the direct-connection switches 127a, 127b (not illustrated) are opened. Consequently, the first input 110a and the second input 110b of the demodulator stage 110 are respectively connected to the second output 110d and to the first output 110c (in practice, the connection is reversed with respect to the immediately preceding read cycle $RD_K$). Alternatively, switching of the direct-connection switches 127a, 127b and of the crossed-connection switches 127c, 127d can occur, in each cycle, at the end, instead of at the start, of the reset step.

In the subsequent canceling step (FIG. 9e), the reset switches 125a, 125b, 125c (not illustrated) switch, whereas the canceling switches 128a, 128b remain closed: the contributions due to offset and low-frequency noise are thus stored in the hold capacitors 122a, 122b of the canceling stage 109.

In the sensing step (FIG. 9f), the first read switch 118a is closed, whereas the second read switch 118b (not illustrated) is opened. Consequently, the modulated read voltage $V_{RDM}$ presents a negative step, having amplitude equal to $-V_{DD}$. At the reading frequency used, the modulated output voltage $V_{OM}$ on output from the canceling stage 109 has substantially the same absolute value that it had in the immediately preceding read cycle $R_{DK}$, but has opposite sign because it is generated in response to a negative-voltage step. The effect of the disturbance current $I_D$ is instead identical. Furthermore, the demodulator stage 110 inverts the connection of the first input 110a and of the second input 110b with the first output 110c and the second output 110d, so that the demodulated output voltage $V_{OD}$ has the same absolute value but is of opposite sign with respect to the modulated output voltage $V_{OM}$.

In practice, owing to the action of the modulated source 106 and of the demodulator 110, the effect of the disturbance current $I_D$ on the demodulated output voltage $V_{OD}$ has opposite sign in any two consecutive read cycles. Since the low-pass filter 112 executes an arithmetic mean of an even number of samples of the demodulated output voltage $V_{OD}$, the effect of the disturbance current $I_D$ and hence of all the possible dispersions upstream of the charge amplifier 120 is substantially eliminated. The modulated source 106 and the demodulator stage are controlled by timing signals (first, second, fourth, and fifth timing signal $S_1$, $S_2$, $S_4$, $S_5$), which have a period twice that of the ones used for reset and canceling (third and sixth timing signal $S_3$, $S_6$). In this way, it is possible to invert in sign the correlation between the modulated read voltage $V_{RDM}$ and the demodulated output voltage $V_{OD}$ in consecutive read cycles, which have the same logic sequence of steps.

The device described herein exploits in a particularly advantageous way the characteristics of discrete-time analog circuits, in particular switched-capacitor ones, for carrying out modulation of the read voltage and demodulation of the output voltage. The modulated source 106 and the demodulator stage 110 are provided by extremely simple and efficient circuit solutions, since, in practice, switches appropriately controlled by the phase-generator stage 113 are used. The solution described affords considerable advantages also from the standpoints of the speed and of power consumption.

FIG. 10 shows a second embodiment of the invention. In this case, an acceleration-detection apparatus 200 comprises an inertial sensor 201, of the differential capacitive MEMS type, as already described previously, and a read device 203, associated to the inertial sensor 201. The read device 203, which is of the discrete-time type, comprises a signal source 204, a modulator stage 205, a sensing stage 207, which in turn includes a charge-voltage converter 208, a canceling stage 209, a demodulator stage 210, and a phase-generator stage 213 substantially identical to the ones already described. Furthermore, the read device 203 includes a sigma-delta analog-to-digital converter of a low-pass type, more simply referred to as sigma-delta converter 212, which is connected downstream of the demodulator stage 210. In this case, the sigma-delta converter 212 advantageously also integrates the function of the low-pass filter and thus suppresses the effects of the disturbance current $I_D$ due to the dispersions upstream of the charge-voltage converter 208. The output of the sigma-delta converter 212 generates a corrected numeric acceleration signal $A_C$ directly starting from the demodulated output voltage $V_{OD}$ supplied by the demodulator stage 210.

Figure 11:
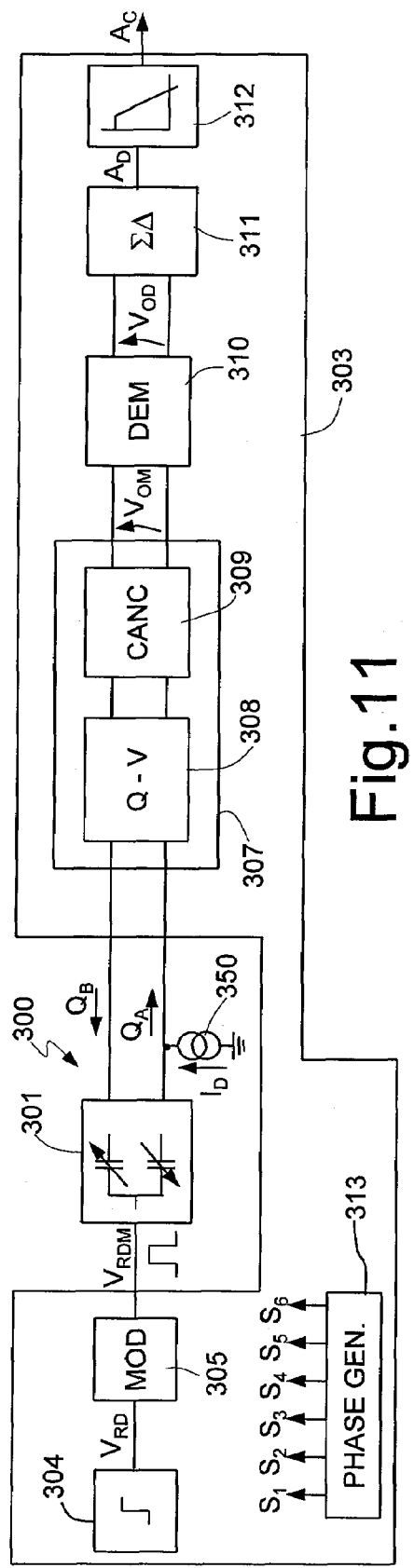
FIG. 11 is a simplified block diagram of a read device of a capacitive sensor in accordance with a third embodiment of the present invention.

In accordance with a third embodiment of the invention (illustrated in FIG. 11), an acceleration-detection apparatus 300 comprises an inertial sensor 301 of the differential capacitive MEMS type, as already described previously, and a read device 303, associated to the inertial sensor 301. The read device 303, of the discrete-time type, comprises a signal source 304, a modulator stage 305, a sensing stage 307, which in turn includes a charge-voltage converter 308, a canceling stage 309, a demodulator stage 310, and a phase-generator stage 313, substantially identical to the ones already described. Furthermore, the read device 303 comprises a sigma-delta converter 311 and a low-pass filter 312 of a numeric type, cascaded to one another downstream of the demodulator stage 310.

The output of the sigma-delta converter 312 generates a demodulated numeric acceleration signal A starting from the demodulated output voltage $V_{OD}$, supplied by the demodulator stage 310. In the demodulated numeric acceleration signal A, there are still present the effects of the disturbance current $I_D$ due to the dispersions upstream of the charge-voltage converter 308.

The low-pass filter 312 receives the demodulated numeric acceleration signal A and calculates a mean value thereof on an even number of samples, for generating a corrected numeric acceleration signal $A_C$.

Figure 12:
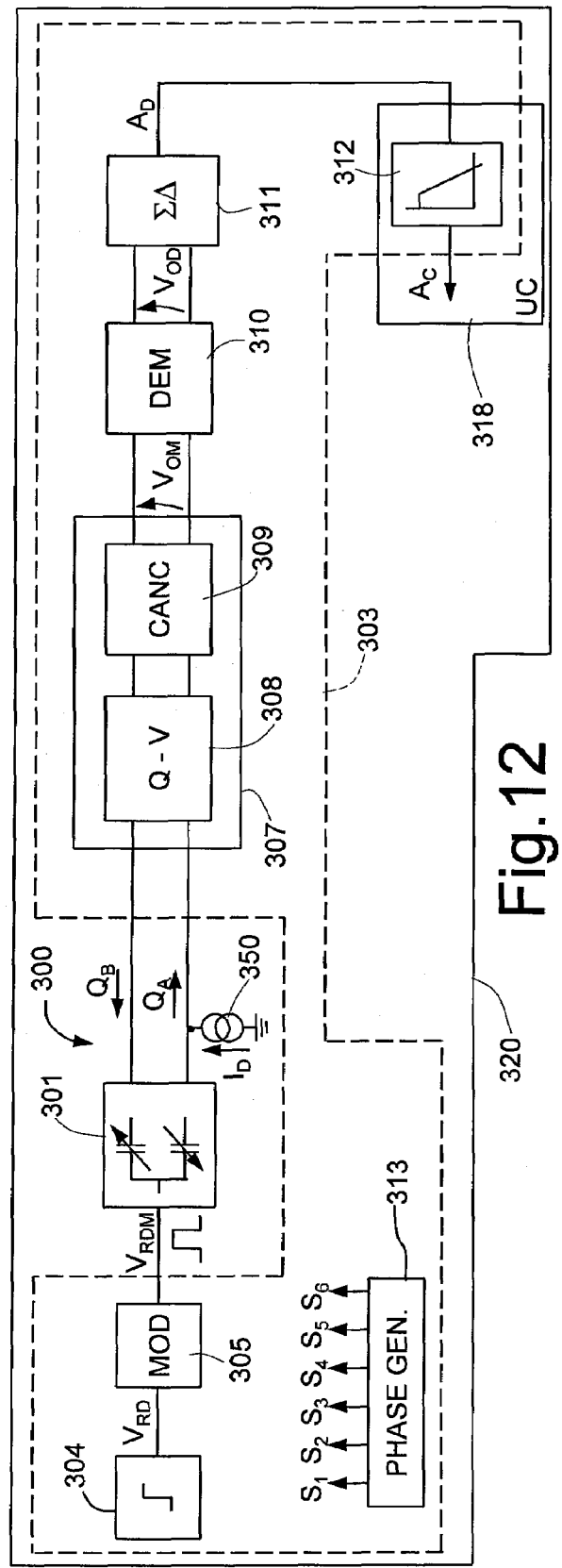
FIG. 12 is a simplified block diagram of an electronic apparatus incorporating the read device illustrated in FIG. 11.

As illustrated schematically in FIG. 12, the low-pass filter 312 can be advantageously integrated in a processing unit 318 of an electronic device 320 incorporating the acceleration-detection apparatus 300, such as, just to cite a few examples, a cell phone, a portable electronic computer or palm-top computer, a control unit of a hard disk drive or of a pointing peripheral for a computer system. Furthermore, the low-pass filter 312 can be obtained by an appropriately configured microprocessor or, alternatively, by dedicated adder and divider circuits. In the latter case, it is particularly advantageous to execute the mean of the demodulated numeric acceleration signal A on a number of samples equal to a power of two.

Finally, it is evident that modifications and variations may be made to the device and to the read method described, without departing from the scope of the present invention, as defined in the annexed claims. In particular, the signal source and the modulator stage can be provided by separate circuits.

The invention claimed is:

1. A read device of a capacitive sensor, comprising:
   modulated signal source structured to generate a modulated electrical read signal and supply said modulated electrical read signal to said capacitive sensor;
   a discrete-time sense circuit, connectable to said capacitive sensor, for generating a first electrical output signal, correlated to capacitance variations of said capacitive sensor, in response to variations of said electrical read signal;
   a demodulator stage, connected to said sense circuit, for demodulating said first electrical output signal and generating a demodulated second electrical output signal; and
   a low-pass filtering stage, connected to said demodulator stage, for generating a filtered third electrical output signal, on the basis of said second electrical output signal; and
   a phase generator structured to control the modulated signal source in first and second read cycles in which the second read cycle is consecutive to said first read cycle, each read cycle including a reset phase and a sense phase, the modulated electrical read signal presenting a first value in the reset phase of the first read cycle, a second value in the sense phase of the first read cycle, the second value in the reset phase of the second read cycle, and the first value in the sense phase of the second read cycle.

2. The device according to claim 1, wherein said modulated signal source comprises:
   a first line, set at a first voltage;
   a second line, supplying a second voltage;
   an output terminal for connection to the capacitive sensor; and
   read connection means for selectively connecting said terminal to said first line and to said second line;
   wherein the phase generator includes sense timing means for controlling said read connection means.

3. The device according to claim 2, wherein said read connection means are controlled by said sense timing means so as to connect said terminal in sequence to said first line during the reset phase of the first read cycle and to said second line during the sense phase of said first read cycle and so as to connect said terminal in sequence to said second line during the reset phase of the second read cycle and to said first line during the sense phase of said second read cycle.

4. The device according to claim 1, comprising reset connection means and reset timing means for selectively bringing said sense circuit into a reset configuration both during said first read cycle and during said second read cycle.

5. The device according to claim 1, wherein said demodulator stage comprises:
   a first input and a second input;
   a first output and a second output;
   direct-connection means for selectively connecting said first input to said first output and said second input to said second output; and
   crossed-connection means for selectively connecting said first input to said second output and said second input to said first output.

6. The device according to claim 5, wherein said demodulator stage comprises demodulation timing means for controlling said direct connection means and said crossed-connection means for connecting said first input to said first output and said second input to said second output during the reset and sense phases of said first read cycle and for connecting said first input to said second output and said second input to said first output during the reset and sense phases of said second read cycle.

7. The device according to claim 1, wherein said filtering stage is configured so as to calculate a mean value of said second electrical output signal on a even number of samples.

8. The device according to claim 1, wherein said filtering stage includes a discrete-time analog filter.

9. The device according to claim 1, wherein said filtering stage includes a low-pass sigma-delta analog-to-digital converter.

10. The device according to claim 1, wherein said filtering stage includes a numeric filter.

11. The device according to claim 1, wherein said sense circuit comprises a charge-voltage converter.

12. The device according to claim 11, wherein said charge-voltage converter comprises a fully differential switched-capacitor charge amplifier.

13. The device according to claim 11, wherein said sense circuit comprises an offset canceling stage associated to said charge-voltage converter.

14. A detecting apparatus comprising:
    a capacitive sensor; and
    a read device that includes:
    a modulated signal source structured to generate a modulated electrical read signal and supply said modulated electrical read signal to said capacitive sensor;
    a discrete-time sense circuit connectable to said capacitive sensor and structured to generate a first electrical output signal, correlated to capacitance variations of said capacitive sensor, in response to variations of said first electrical read signal;
    a demodulator stage connected to said sense circuit and structured to demodulate said first electrical output signal and generate a demodulated second electrical output signal;
    a low-pass filtering stage connected to said demodulator stage and structured to generate a filtered third electrical output signal based on said second electrical output signal; and
    a phase generator structured to control the modulated signal source in first and second read cycles in which the second read cycle is consecutive to said first read cycle, each read cycle including a reset phase and a sense phase, the modulated electrical read signal presenting a first value in the reset phase of the first read cycle, a second value in the sense phase of the first read cycle, the second value in the reset phase of the second read cycle, and the first value in the sense phase of the second read cycle.

15. The apparatus according to claim 14, wherein said capacitive sensor is a differential micro-electromechanical sensor.

16. The apparatus according to claim 14, wherein said modulated signal source comprises:
a first line, set at a first voltage;
a second line, supplying a second voltage;
an output terminal for connection to the capacitive sensor; and
first and second switches that selectively connect said terminal to said first line and to said second line;
wherein the phase generator is structured to provide phased first and second control signals to the first and second switches.

17. The apparatus according to claim 14, wherein said demodulator stage comprises:
a first input and a second input;
a first output and a second output;
first and second switches, that selectively connect said first input to said first output and said second input to said second output; and
third and fourth switches that selectively connect said first input to said second output and said second input to said first output.

18. The apparatus according to claim 17, wherein said demodulator stage comprises demodulation timing means for controlling said switches in a manner that connects said first input to said first output and said second input to said second output during the reset and sense phases of the first read cycle and connects said first input to said second output and said second input to said first output during the reset and sense phases of the second read cycle that is consecutive to the first read cycle.

19. An electronic device, comprising:
a processing unit;
a capacitive sensor; and
a read device coupled to the processing unit and including:
a modulated signal source structured to generate a modulated electrical read signal and supply said modulated electrical read signal to said capacitive sensor;
a discrete-time sense circuit connectable to said capacitive sensor and structured to generate a first electrical output signal, correlated to capacitance variations of said capacitive sensor, in response to variations of said first electrical read signal;
a demodulator stage connected to said sense circuit and structured to demodulate said first electrical output signal and generate a demodulated second electrical output signal; and
a phase generator structured to control the modulated signal source in first and second read cycles in which the second read cycle is consecutive to said first read cycle, each read cycle including a reset phase and a sense phase, the modulated electrical read signal presenting a first value in the reset phase of the first read cycle, a second value in the sense phase of the first read cycle, the second value in the reset phase of the second read cycle, and the first value in the sense phase of the second read cycle.

20. The device according to claim 19 wherein the processing unit includes a low-pass filtering stage connected to said demodulator stage and structured to generate a filtered third electrical output signal based on said second electrical output signal.

21. The device according to claim 19 wherein the device is a portable phone.

22. The device according to claim 19, wherein said modulated signal source comprises:
a first line, set at a first voltage;
a second line, supplying a second voltage;
an output terminal for connection to the capacitive sensor; and
first and second switches that selectively connect said terminal to said first line and to said second line;
wherein the phase generator is structured to provide phased first and second control signals to the first and second switches.

23. The device according to claim 19, wherein said demodulator stage comprises:
a first input and a second input;
a first output and a second output;
first and second switches that selectively connect said first input to said first output and said second input to said second output; and
third and fourth switches that selectively connect said first input to said second output and said second input to said first output.

24. The device according to claim 23, wherein said demodulator stage comprises demodulation timing means for controlling said switches in a manner that connects said first input to said first output and said second input to said second output during the reset and sense phases of the first read cycle and connects said first input to said second output and said second input to said first output during the reset and sense phases of the second read cycle that is consecutive to the first read cycle.

25. A method for reading a capacitive sensor, comprising:
generating a modulated electrical read signal;
driving said capacitive sensor by said modulated electrical read signal;
discrete-time generating a first electrical output signal correlated to variations of capacitance of said capacitive sensor, in response to variations of said first electrical read signal;
demodulating said first electrical output signal for generating a demodulated second electrical output signal; and
low-pass filtering said second electrical output signal for generating a filtered third electrical output signal, wherein generating the modulated electrical read signal includes:
providing the modulated electrical read signal as a first value in a reset phase of a first read cycle;
providing the modulated electrical read signal as a second value in a sense phase of the first read cycle;
providing the modulated electrical read signal as the second value in a reset phase of a second read cycle that is consecutive to the first read cycle; and
providing the modulated electrical read signal as the first value in a sense phase of the second read cycle.

26. The method according to claim 25, wherein said step of modulating comprises:
connecting a driving terminal of said capacitive sensor in sequence to a first line during the reset phase of the first read cycle, set at a first voltage, and, during the sense phase of the first read cycle, to a second line, supplying a second voltage; and
connecting said driving terminal in sequence to said second line during the reset phase of the second read cycle and to said first line during the sense phase of the second read cycle.

27. The method according to claim 25, comprising the steps of:
　　connecting a sense circuit to said capacitive sensor; and
　　bringing said sense circuit into a reset configuration both during said first read cycle and during said second read cycle.

28. The method according to claim 25, wherein said demodulating step comprises:
　　supplying said first electrical output signal between a first terminal and a second terminal;
　　supplying said second electrical output signal between a third terminal and a fourth terminal;
　　connecting said first terminal to said third terminal and said second terminal to said fourth terminal during the reset and sense phases of said first read cycle; and
　　connecting said first terminal to said fourth terminal and said second terminal to said third terminal during the reset and sense phases of said second read cycle.

29. The method according to claim 25, wherein said sense circuit comprises a fully differential switched-capacitor charge amplifier.

30. The method according to claim 25, wherein said step of low-pass filtering comprises calculating a mean value of said second electrical output signal on an even number of samples.

31. The method according to claim 30, wherein said step of low-pass filtering comprises executing an analog-to-digital conversion by a low-pass sigma-delta converter.

\* \* \* \* \*